(12) United States Patent
Coates

(10) Patent No.: US 6,488,302 B2
(45) Date of Patent: Dec. 3, 2002

(54) BICYCLE TRAINING HANDLE

(76) Inventor: Budd L. Coates, 424 Ridge St., Emmaus, PA (US) 18049

(*) Notice: Subject to any disclaimer, the term of this patent is extended or adjusted under 35 U.S.C. 154(b) by 0 days.

(21) Appl. No.: 09/953,216

(22) Filed: Sep. 17, 2001

(65) Prior Publication Data

US 2002/0030346 A1 Mar. 14, 2002

Related U.S. Application Data

(63) Continuation-in-part of application No. 09/296,415, filed on Apr. 23, 1999, now abandoned.

(51) Int. Cl.[7] ................................................. B62H 7/00
(52) U.S. Cl. ...................................................... 280/293
(58) Field of Search ............................. 280/293, 304.5; 403/234, 233, 235, 262, 237; 74/551.9; 434/247, 258

(56) References Cited

U.S. PATENT DOCUMENTS

| | | | |
|---|---|---|---|
| 3,650,544 A | 3/1972 | Cassell | |
| 4,225,104 A | * 9/1980 | Larson | ........................ 16/422 |
| 4,917,398 A | 4/1990 | Pinto | |
| 5,154,096 A | 10/1992 | Geller et al. | |
| 5,303,944 A | 4/1994 | Kalmus | |
| 5,306,030 A | 4/1994 | Becka | |
| 5,338,204 A | 8/1994 | Herndon | |
| 5,564,726 A | 10/1996 | Hearn et al. | |
| 5,577,750 A | 11/1996 | Sklar | |
| 5,683,093 A | 11/1997 | Hayes | |
| 5,791,675 A | 8/1998 | Fleischer | |
| 5,915,711 A | 6/1999 | Seiple | |
| 5,988,663 A | 11/1999 | Starks | |
| 6,120,050 A | * 9/2000 | Tillim | ........................ 280/293 |
| 6,431,422 B1 | * 8/2002 | Moore et al. | ................. 224/427 |

FOREIGN PATENT DOCUMENTS

| | | | | |
|---|---|---|---|---|
| DE | 3534262 A1 | * 5/1987 | ............ | B62H/7/00 |
| FR | 2600963 | 7/1986 | | |

\* cited by examiner

*Primary Examiner*—Kevin Hurley
(74) *Attorney, Agent, or Firm*—Shoemaker and Mattare

(57) ABSTRACT

A bicycle training handle has a clamp at its forward end, for attachment to the seat post of a child's bike, and a gripping portion at its rearward end so that one may steady a bicycle being ridden by a child while walking or running at a safe distance behind the bike. The geometry of the handle places the gripping portion of the handle at an ergonomically correct and comfortable position and orientation.

12 Claims, 4 Drawing Sheets

BICYCLE TRAINING HANDLE

This application is a continuation-in-part of application Ser. No. 09/296,415 filed Apr. 23, 1999 now abandoned.

BACKGROUND OF THE INVENTION

This invention relates to a device for helping a child learning to ride a bicycle.

Parents can help children avoid some of the painful spills that are part of learning to ride a bicycle. Running along behind the bicycle, holding onto the seat, for example, one can at least attempt to steady the bike for the child. But this method puts the parent so close to the bicycle's pedals and rear wheel that the parent is apt to become involved in, or possibly even the source of, some falls. The proximity of the parent can also be a distraction for the child. A number of inventors have, therefore, proposed training devices in the form of bars or handles which can be attached to the bicycle, for example, the seat post (which is clamped within and extends from the upper end of the seat tube). The parent can then walk or run along at a safer and less distracting distance with considerably more control than before.

All of the prior training devices of the type mentioned have drawbacks which I propose to solve with this invention. In particular, no prior device has been ergonomically correct for the parent. Those that were adjustable had too many parts to be practical. I therefore undertook to develop a bicycle training handle with the following objectives:

SUMMARY OF THE INVENTION

An object of the invention is to provide a bicycle training handle which clamps simply and securely to a child's bike without requiring any special tools.

Another object is to provide a device which does not interfere with the workings of the bicycle, or with the child.

A further object of the invention is to avoid changing the lateral balance of the bicycle when the handle is released by the parent.

It is also an object of the invention to provide a training handle which is ergonomically correct for the parent, allowing him to walk or run upright at a safe distance from the bicycle with his elbow and shoulder in a comfortable position.

These and other objects are attained by a bicycle training handle as described below.

BRIEF DESCRIPTION OF THE DRAWINGS

In the accompanying drawings.

DESCRIPTION OF THE PREFERRED EMBODIMENT

Figure 1:
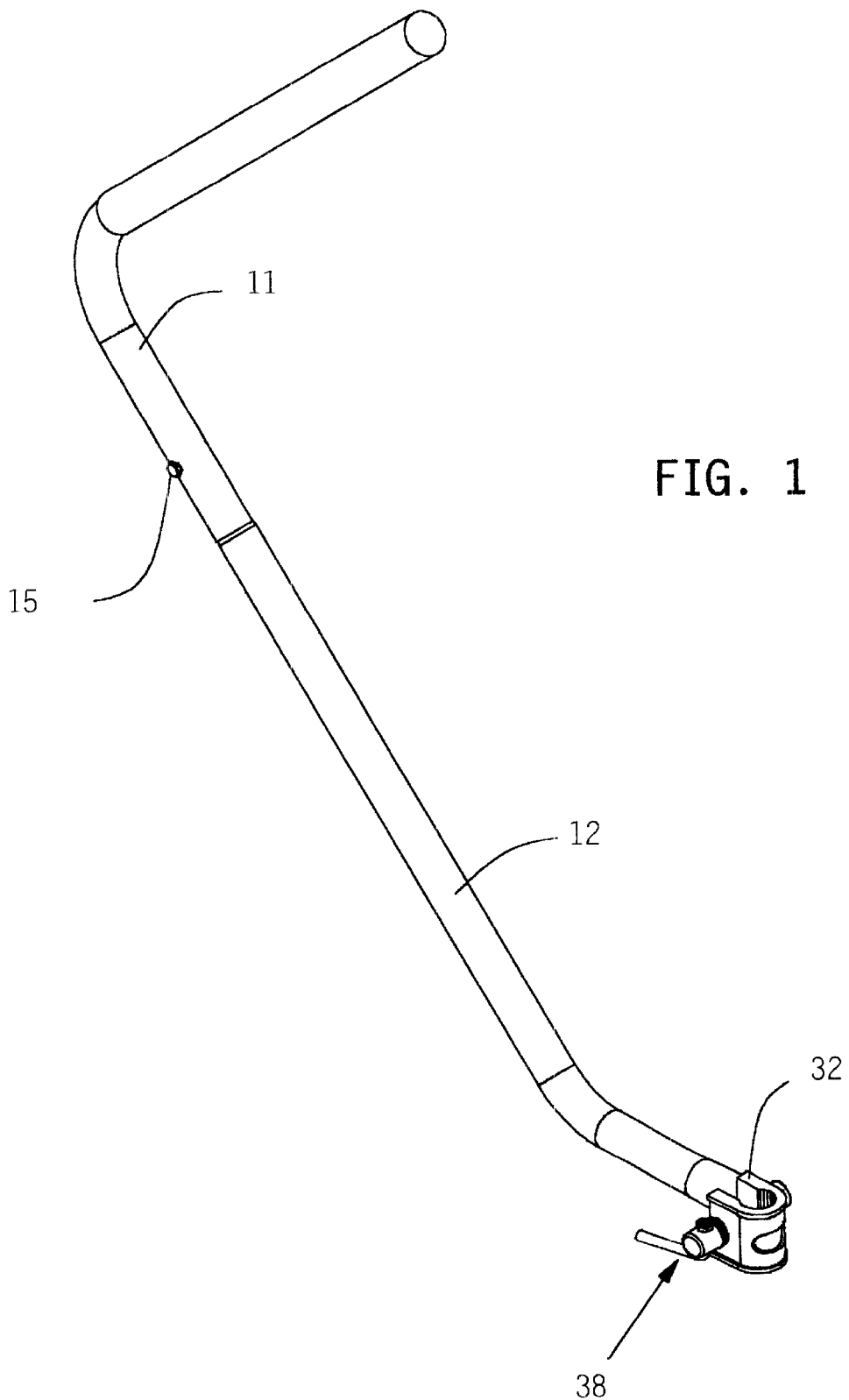
FIG. 1 is a perspective view of a bicycle training handle embodying the invention.

A bicycle training handle 10 embodying the invention is shown in FIG. 1. The handle is an assembly of two tube sections 11, 12 which are bent at 13, 14, respectively, to form first, second and third straight segments 16, 18 and 20. The tube sections have a telescoping fit and are held together by a fastener 15. The bend radius may depend on the material of the bar. Cold rolled steel tubing, one inch in outside diameter, is presently contemplated. The angle of bend 13 is about 90°, while that of bend 14 is about 135°. The segments 16, 18 and 20 have lengths of about 6, 27 and 15 inches, respectively. The distal end of the first segment supports a clamp having a gripping axis perpendicular to the length of the first segment.

Figure 2:
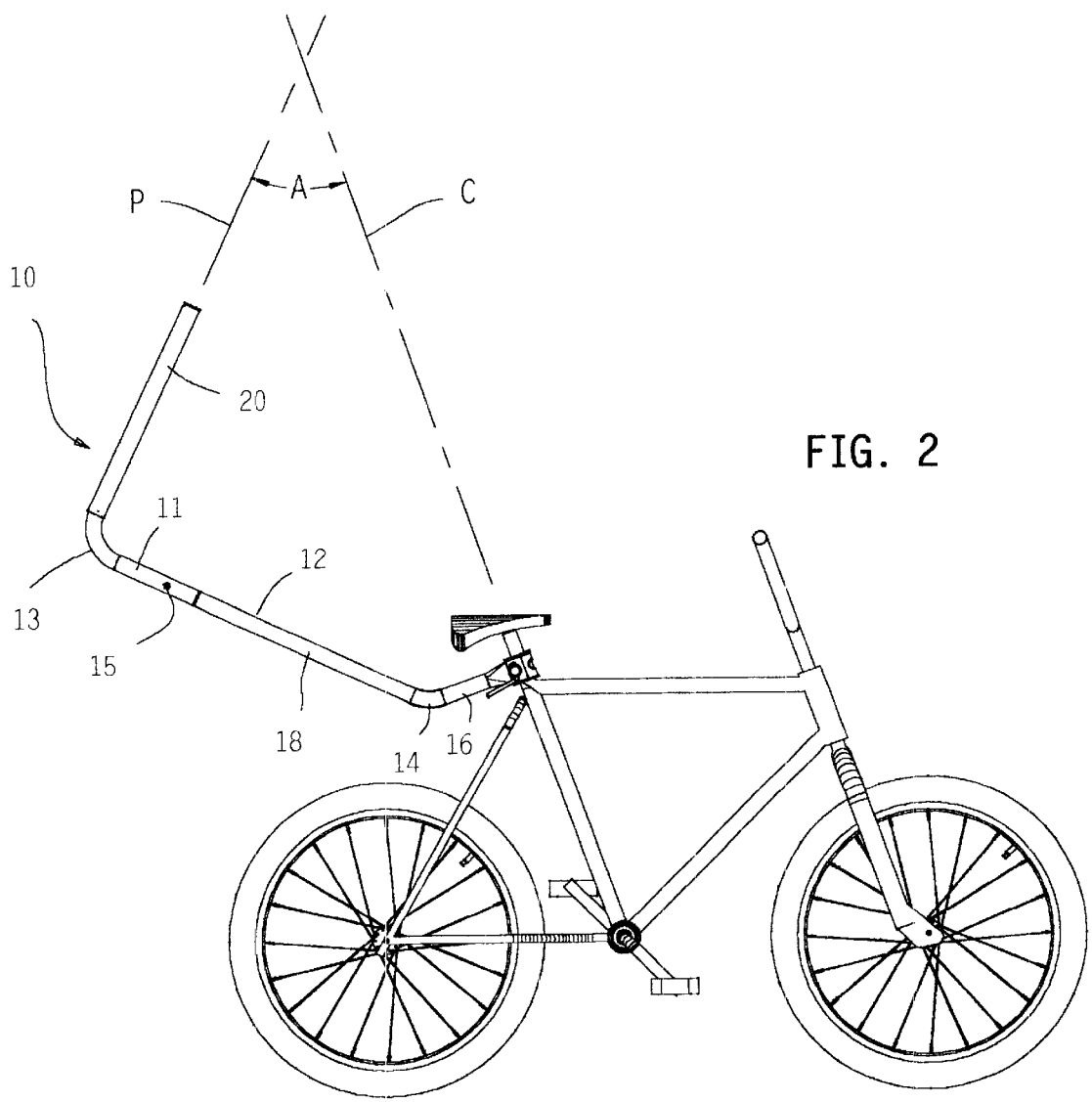
FIG. 2 is a side view of the handle, affixed to a child's bicycle.

As a result of the geometry described above, it can be determined that a projection "P" of the third segment would intersect a projection of the clamp axis "C" at a distance of about forty-one inches above the center of the clamp, as shown in FIG. 2, and the angle "A" between axes "C" and "P" is 45°. All points of the gripping portion are at least thirty inches away from the clamp. With the handle installed on a 70° seat post at a point twenty-seven inches above the ground, the center of the third segment (the gripping portion) is forty-four inches above the ground and ten inches behind the rear wheel (standard 20"), and the third segment is inclined 25° forward from vertical, away from the holder. This is comfortable and ergonomically correct for the wrist.

It should be understood that the construction described is only that presently preferred, and that the location and orientation of the third segment that is more important than the exact geometry of the first and second segments. One could find any number of other curvilinear constructions that resulted in the desired handle orientation.

A foam grip or the like is installed on the upper end of the third segment. It is approximately fifteen inches long—long enough to accommodate both hands of an adult.

Figure 3:
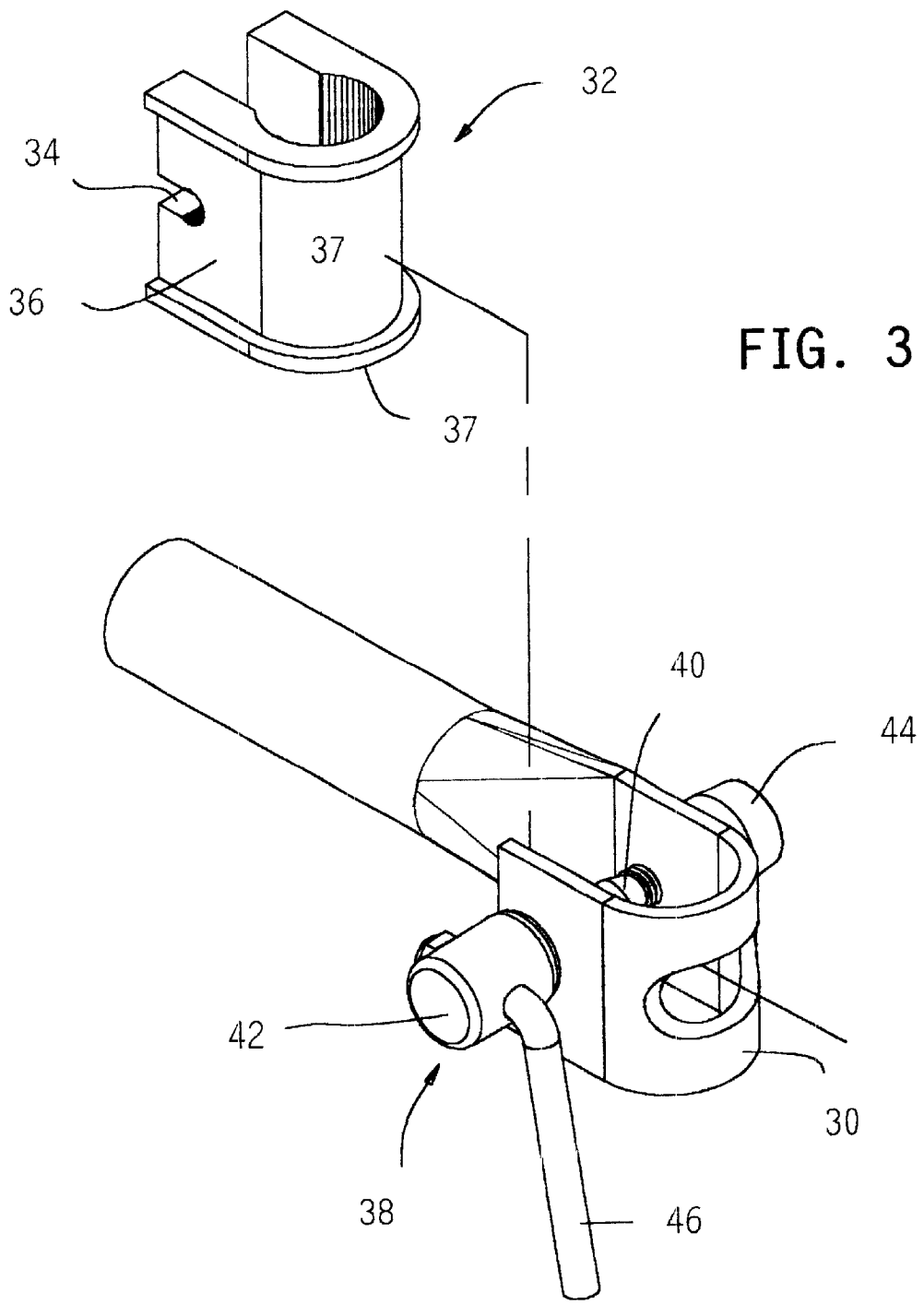
FIG. 3 is an exploded perspective view of a clamp forming part of the invention.

The lower section 12 of the handle has a U-bend 30 at its flattened forward end (FIG. 3), designed to receive a clamp for engaging the seat post of a child's bike. The clamp includes a horseshoe-shaped insert 32, which is seated in the U-bend at the end of the handle. The insert has an inside radius about equal to the outside radius of a seat post, and slots 34 in its arms 36. The flanges 37 at the ends of the insert retain the insert within the U-bend.

A quick-release mechanism 38 passes through the slots and draws the arms of the insert together. The quick-release mechanism has a shaft 40 which is secured in a head 42 at one end; the other end of the shaft is threaded to receive a nut 44 which can be turned for fine adjustment of the length of the mechanism. A pivoting lever 46 operates a cam (not shown) within the head to tighten the clamp by drawing the shaft into the head. Such mechanisms are well known. To install the clamp, the insert is placed over the upper end of the seat post, and once the handle is in its desired orientation, the quick release mechanism is tightened to lock the handle to the seat post.

Figure 4:
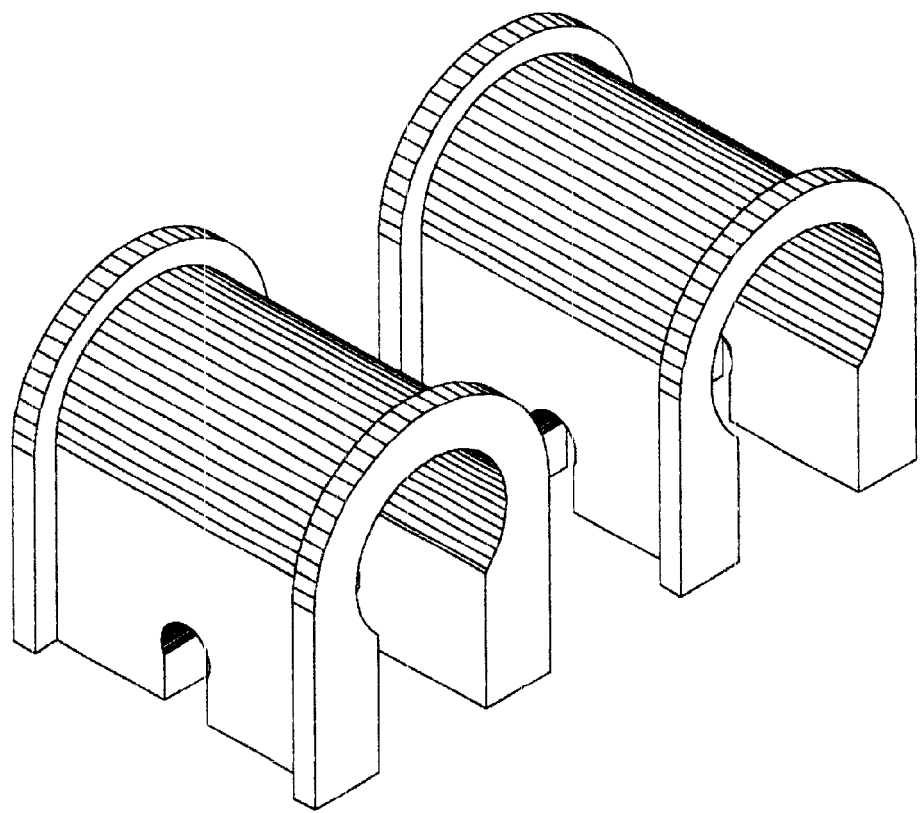
FIG. 4 shows alternative forms of a clamp insert.

I prefer to provide two or more different inserts, having different internal dimensions, to enable one to damp the handle to seat posts of different diameters. FIG. 4 shows two such inserts, the one on the left being designed for a smaller diameter post than the one on the right.

It may be noted that one does not need to remove the seat in order to install the training handle because the clamp insert may be slid laterally over the seat post. The hooked end of the handle is then slid over the insert, and the quick-release mechanism is installed last.

In operation, the training handle is used to steady the bicycle while a young person climbs on and starts to ride. The parent can give a little push on the bar to get things started, and thereafter may apply as much force as necessary to keep the bike upright. The child may have an illusion of being independent, since the adult is at a good distance from the rider. The adult may release the bar altogether when the appropriate time comes, because the location of the bar keeps it from interfering with normal solo bicycling movements.

Since the invention is subject to modifications and variations, it is intended that the foregoing description and the accompanying drawings shall be interpreted as only illustrative of the invention defined by the following claims.

I claim:

1. A bicycle training handle comprising a bar having forward and rearward ends, a clamp affixed at the forward end of the bar, suitable for connection to a bicycle's seat post, said clamp having a clamping axis corresponding to that of the seat post, and a straight gripping portion at the rearward end of the bar, the gripping portion having a longitudinal axis and being angled forward so that an upward projection of said longitudinal axis intersects said clamping axis.

2. The invention of claim 1, wherein the bar has first, second and third straight segments in series, the first segment forming a portion of said clamp at its forward end, the third segment forming said gripping portion.

3. The invention of claim 2, wherein the third segment is perpendicular to the second segment.

4. The invention of claim 1, further comprising a resilient handgrip installed on the gripping portion.

5. The invention of claim 4, wherein the gripping portion and the handgrip are sufficiently long to permit two-handed gripping.

6. The invention of claim 1, wherein the bar is formed in two sections which can be disassembled.

7. The invention of claim 1, wherein an upward projection of said longitudinal axis intersects said clamping axis at a point about 41 inches above said clamp.

8. The invention of claim 7, wherein said longitudinal axis and said clamping axis subtend an angle of about 45°.

9. The invention of claim 1, further comprising a clamp disposed at the forward end of the bar, said clamp being adapted to grip the seat post of a bicycle along an axis perpendicular to the axis of the forward end of the bar.

10. The invention of claim 9, wherein the clamp comprises a quick release mechanism including a threaded shaft and a lever for altering the effective length of said shaft.

11. The invention of claim 10, further comprising a U-shaped portion formed of flattened tubing at the forward end of the bar, a polymeric horseshoe-shaped insert adapted to slide laterally over the seat post and into the U-shaped portion, both the U-shaped portion and the insert having concentric holes through which the shaft of the quick release mechanism may pass.

12. The invention of claim 11, comprising a plurality of said inserts, said inserts having different internal dimensions to enable one to clamp seat posts of different diameters.

* * * * *